United States Patent [19]

Harrington

[11] Patent Number: 5,241,396
[45] Date of Patent: Aug. 31, 1993

[54] COLOR PRINTING YIELDING A DENSE BLACK IMAGE

[75] Inventor: Steven J. Harrington, Holley, N.Y.

[73] Assignee: Xerox Corporation, Stamford, Conn.

[21] Appl. No.: 760,433

[22] Filed: Sep. 16, 1991

[51] Int. Cl.$^5$ .................. H04N 1/387; H04N 1/21; G03F 3/08

[52] U.S. Cl. .................. 358/296; 358/529; 358/515

[58] Field of Search .............. 358/296, 75, 79, 80, 358/448, 453–461; 395/128

[56] References Cited

U.S. PATENT DOCUMENTS

| | | | |
|---|---|---|---|
| 4,700,399 | 10/1987 | Yoshida | 358/80 X |
| 4,953,015 | 8/1990 | Hayasaki et al. | 358/75 X |
| 5,047,844 | 9/1991 | Ikeda et al. | 358/80 |
| 5,079,624 | 1/1992 | Sasuga | 358/75 |
| 5,119,187 | 6/1992 | Ikeda et al. | 358/80 |
| 5,142,355 | 8/1992 | Fujima | 358/75 |

Primary Examiner—Benjamin R. Fuller
Assistant Examiner—Eric Frahm
Attorney, Agent, or Firm—Xerox Corporation

[57] ABSTRACT

A dense black image is formed by printing the black ink in combination with at least one other ink without resulting in thick, blurred figure edges. A bitmap of binary information is provided for each of a plurality of color separations, each bitmap indicating desired locations of ink spots for a color separation. Spots are eroded on the boundaries of black areas in the black bitmap to form a modified black bitmap. The modified black bitmap is printed in at least one color other than black at the same time that the bitmaps for the color separations other than black are printed. The black bitmap is then printed in black over the printed modified black bitmap to yield a dense black image.

14 Claims, 1 Drawing Sheet

COLOR PRINTING YIELDING A DENSE BLACK IMAGE

BACKGROUND OF THE INVENTION

1. Field of the Invention

The present invention relates to color printing in which a color separation for each of a plurality of colors is performed to yield an image and, more particularly, to color printing which yields dense black images.

2. Description of the Related Art

Electronic color printers use a plurality of inks such as cyan, magenta, yellow and black. While the combination of cyan, magenta and yellow should yield black, it is often difficult to achieve the color black which is free of any unwanted color using this combination. Accordingly, the additional use of black ink yields a black which is generally free of unwanted color.

The black ink which is used in these electronic color printers is not necessarily very dense. Thus, what should be black ink may, in actuality, be a very dark gray ink or may be a mottled ink.

One proposed method to improve the density of the black image when a black ink is used which is not sufficiently dense is to print the image in black ink as well as printing the image using one or more of the other colored inks. In printing the black ink in combination with one or more of the other inks, the black ink removes color from an image that is already dark due to the presence of the other inks. Therefore, more light is absorbed by the image printed in a combination of inks. It is sometimes recommended that the three color process black, i.e., cyan, magenta and yellow inks, be used for light regions and that the black ink only be added as an overprint in a dark shadowed area to improve density.

Such printing has drawbacks associated therewith, however. The overprinting of inks may yield ink spots that are larger than a desirable size due to the presence of the additional ink or due to registration problems. In particular, since the color black is often used in images to define fine lines and characters, the overprinting of inks results in the thickening of the fine lines and characters and the blurring of edges of the ink spots.

U.S. Pat. No. 4,700,399 to Yoshida discloses a color image processing apparatus as described above which has a detector for detecting an edge of an image and a control unit for controlling a black reproduction quantity for an edge according to an output from the detector. For edges, densities of color signals for yellow, magenta, and cyan are reduced in accordance with the edge quantity to increase black density.

U.S. Pat. No. 4,953,015 to Hayasaki et al. discloses a method for printing a color image which makes it possible to obtain black of high density in a printout image. Black ink dots are placed on an image receiving medium so as to produce a black area of an image. A plurality of other inks such as yellow, cyan and magenta are allotted according to a color matrix table and are placed in the form of dots superimposed on at least a part of the black ink. Accordingly, the superimposition of dots can yield larger, blurred spots.

A printing method is desirable which yields dense black images having edges which are not thickened or blurred due to additional ink or registration problems.

OBJECTS AND SUMMARY OF THE INVENTION

One object of the present invention is to provide a method for printing a dense black image which does not have thickened, blurred edges.

Another object of the present invention is to provide a method for printing a dense black image which is not mottled or gray in appearance.

A further object of the present invention is to provide a method for printing a dense black image which does not modify the colors in the image.

To achieve the foregoing and other objects and to overcome the shortcomings discussed above, a color printing method is provided which yields a dense black image. Bitmaps are provided for each of a plurality of color separations, e.g., cyan, magenta, yellow and black separations. An erosion operation is applied to the black bitmap or a copy thereof such that the boundaries of the regions of the black bitmap are reduced by one or more pixels. The eroded black bitmap is to be printed in a color other than black. The amount of erosion is selected in accordance with expected registration errors. The bitmaps for the color separations other than black and the eroded black bitmap are combined. Ink is deposited in accordance with the combined bitmaps. Thereafter, black ink is deposited thereover in accordance with the original black bitmap.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
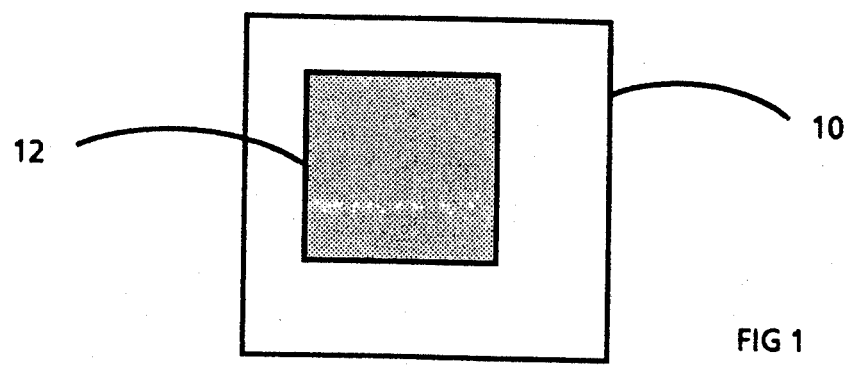
FIG. 1 illustrates a bitmap for a black color separation.

Referring now to the drawings, and particularly to FIG. 1 thereof, a bitmap 10 of binary information for a black color separation is shown. Bitmap 10 illustrates an area of an image which is to be printed in black ink. The area of the image to be printed in black ink has a boundary 12. The remaining portions of the image are to be printed in different ink colors in corresponding color separations. A different color separation is performed for each color of ink used to form the composite image.

For exemplary purposes, in accordance with the present invention, four colors of ink, i.e., cyan, magenta, yellow and black inks, are used to form a composite image. Because the black ink is not as dense as a black color obtained by combining the cyan, magenta and yellow inks, the black ink is not used alone when a dense black image is a desired result. Further, the combination of the cyan, magenta and yellow inks also yields a black image which is not as dense as the black image desired.

To improve the density of the black image, the present invention provides a bitmap of binary information for each of the cyan, magenta, yellow and black separations.

Figure 2:
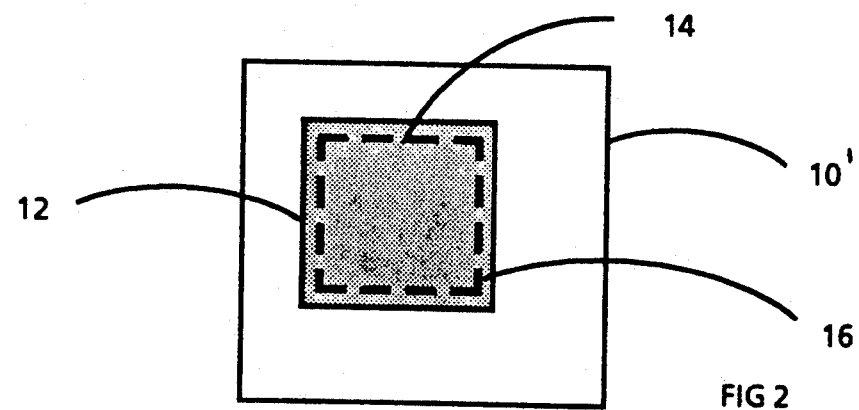
FIG. 2 illustrates an eroded bitmap for the black color separation of Figure according to the present invention.

As illustrated in FIG. 2, the black bitmap 10 is modified such that the boundaries 12 of black areas are eroded by an amount 16 to form a resultant modified black bitmap 10' having an area bounded by boundary 14, this area being smaller than the area bounded by boundary 12 in the original black bitmap 10.

The modified black bitmap 10' yields binary information to be printed in colors other than black. The bitmaps of binary information for each color separation other than the black color separation, which are to be used in superposition with the black to achieve greater density, are combined with the modified black bitmap 10'. Inks are deposited for the colors other than black in accordance with the combined bitmaps. Thereafter, the black bitmap 10 is printed in black ink over the combined bitmaps.

The amount of erosion 16 should be selected to compensate for any expected registration errors occurring at the performance of each of the color separations. Thus, even if the color separations are not performed in precise superimposed registration, deposit of the black ink over the printed modified black bitmap would not yield thickened, blurred black images.

The eroded black bitmap can be obtained by actually copying the bitmap of binary information for the black image. Alternatively, the eroded black bitmap can be obtained by calculating the value of any spot from the information in the original black bitmap. For example, if the value of a spot at a position (i,j) in the original black bitmap is B(i,j), the value of the spot at position (i,j) in the modified black bitmap is B'(i,j). The value of the spot in the eroded black bitmap can be given by the conjunction of neighbors to the spot of the original black bitmap in accordance with the following equation:

$$B'(i,j) = B(i,j) \wedge B(i+1,j) \wedge B(i-1,j) \wedge B(i,j+1) \wedge B(i,j-1) \quad (1)$$

If the value in the original bitmap for the additional color is C(i,j), the value actually used to print the color would be the disjunction C'(i,j) determined in accordance with the following equation:

$$C'(i,j) = C(i,j) \vee B'(i,j) \quad (2)$$

The above-described printing method yields images having dense black areas without yielding thickened, blurred edges. The printing method does not modify the colors in the image since the additional ink is placed beneath the black and acts only to increase the density of the black areas. The erosion step guarantees that the additional ink will lie beneath the black, even when registration errors occur.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A printing method for forming a dense black image, said method comprising the steps of:
   providing an original bitmap of binary information for a black image to indicate desired locations of black ink spots for the black image, said black image having a first boundary;
   deriving a modified black bitmap of binary information for an image having a second boundary smaller than said first boundary;
   printing the modified black bitmap in at least one color different from black; and
   printing the original bitmap in black.

2. The method according to claim 1, including printing the original bitmap over the printed modified black bitmap.

3. The method according to claim 1, including printing the modified black bitmap in at least one of cyan, magenta and yellow.

4. The method according to claim 1, wherein said derivation of the modified black bitmap includes eroding spots on boundaries of black areas in said original bitmap.

5. The method according to claim 1, wherein said derivation of the modified black bitmap includes calculating the value of each spot in a modified black bitmap from the original bitmap of binary information.

6. A color printing method in which a color separation for each of a plurality of colors is performed to yield an image, said method comprising the steps of:
   providing an original bitmap of binary information for each color separation to indicate desired locations of ink spots in each separation, said original bitmap having a first boundary, said bitmap providing step including providing a bitmap for each of a black color separation and at least one of a color separating different from the black color separation;
   deriving a modified black bitmap having a second boundary smaller than said first boundary;
   printing the modified black bitmap in at least one color different from black; and
   printing the original bitmap in black.

7. The method according to claim 6, including printing the original bitmap over the printed modified black bitmap.

8. The method according to claim 6, including printing the modified black bitmap in at least one of cyan, magenta and yellow.

9. The method according to claim 6, further comprising printing the bitmap for the at least one color separation different from the black color separation when the modified black bitmap is printed.

10. The method according to claim 9, including printing the bitmap for the at least one color separation different from the black color separation and the modified black bitmap prior to printing the original bitmap.

11. The method according to claim 6, wherein said derivation of the modified black bitmap includes eroding spots on boundaries of black areas in said original bitmap.

12. The method according to claim 6, wherein said derivation of the modified black bitmap includes calculating a value of each spot in the modified black bitmap from the original black bitmap of binary information.

13. A printing method for forming a dense black image, said method comprising the steps of:
   providing an original bitmap of binary information for a black image to indicate desired locations of black ink spots for the black image;
   deriving a modified black bitmap by the step of eroding spots on boundaries of black areas in said original bitmap;
   printing the modified black bitmap in at least one color different from black; and printing the original bitmap in black.

14. A color printing method in which a color separation for each of a plurality of colors is performed to yield an image, said method comprising the steps of:

providing an original bitmap of binary information for each color separation to indicate desired locations of ink spots in each separation, said bitmap providing step including providing a bitmap for each of a black color separation and at least one of a color separation different from the black color separation;

deriving a modified black bitmap by the step of eroding spots on boundaries of black areas in said original bitmap;

printing the modified black bitmap in at least one color different from black; and printing the original bitmap in black.

* * * * *